United States Patent
Mihajlovic et al.

(10) Patent No.: US 11,868,694 B1
(45) Date of Patent: Jan. 9, 2024

(54) SYSTEM AND METHOD FOR OPTIMIZING EMULATION THROUGHPUT BY SELECTIVE APPLICATION OF A CLOCK PATTERN

(71) Applicant: Synopsys, Inc., Mountain View, CA (US)

(72) Inventors: Bojan Mihajlovic, Marlborough, MA (US); Alexander Rabinovitch, Marlborough, MA (US); Fei Chen, Marlborough, MA (US)

(73) Assignee: SYNOPSYS, INC., Sunnyvale, CA (US)

( * ) Notice: Subject to any disclaimer, the term of this patent is extended or adjusted under 35 U.S.C. 154(b) by 704 days.

(21) Appl. No.: 16/874,197

(22) Filed: May 14, 2020

Related U.S. Application Data (60) Provisional application No. 62/847,418, filed on May 14, 2019.

(51) Int. Cl.
*G06F 30/3312* (2020.01)
*G06F 119/12* (2020.01)

(52) U.S. Cl.
CPC ...... *G06F 30/3312* (2020.01); *G06F 2119/12* (2020.01)

(58) Field of Classification Search
CPC .................................................. G06F 30/3312
USPC ........................................................... 716/134
See application file for complete search history.

(56) References Cited

U.S. PATENT DOCUMENTS

| 2009/0063888 A1* | 3/2009 | Gold ......................... G06F 1/08 713/501 |
| 2019/0034179 A1* | 1/2019 | Moiseev ................. G06F 30/00 |

\* cited by examiner

*Primary Examiner* — Eric D Lee
(74) *Attorney, Agent, or Firm* — Lewis Roca Rothgerber Christie LLP (57) ABSTRACT

A system is disclosed that includes a memory, and a processor configured to perform operations stored in the memory. The processor performs the operations to analyze each of a first set of sequential elements of a plurality of sequential elements to determine an edge of a clock signal pattern of a clock associated with each of the first set of sequential elements causing an output change at corresponding one or more sequential elements of the first set of sequential elements. The processor further performs the operations to discard one or more cycles of the clock signal pattern of the clock from emulation that do not include the edge of the clock signal pattern that causes at least one sequential element of the first set of sequential elements to change the output and emulate remaining cycles of the clock signal pattern of the clock.

18 Claims, 8 Drawing Sheets

SYSTEM AND METHOD FOR OPTIMIZING EMULATION THROUGHPUT BY SELECTIVE APPLICATION OF A CLOCK PATTERN

CROSS-REFERENCE TO RELATED APPLICATIONS

The present application claims the benefit under 35 U.S.C. § 119(e) of U.S. Provisional Patent Application No. 62/847,418 filed on May 14, 2019, which is incorporated herein by reference in its entirety for all purposes.

TECHNICAL FIELD

The present disclosure is generally related to electronic design automation. In particular, the present disclosure is related to a system and method for optimizing emulation throughput by selective application of a clock pattern.

BACKGROUND

In a typical implementation of emulation, a clock cycle is broken into two disjoint phases in which a clock and a data input are evaluated. Initially, the values of clocks are evaluated in response to a change in primary inputs. The evaluated clocks are then applied to sequential elements such as design flip-flops and latches, allowing the updated outputs of those sequential elements to propagate within the design.

An overlay between the clock and data propagation can be achieved by evaluating clocks one cycle ahead of the evaluation of flip-flops and latches in the design to expedite the speed of emulation. For example, during an emulation cycle K, the values of clocks are computed as in cycle K+1 of reference emulation. At the beginning of cycle K+1, the stable value of the clocks as computed in cycle K is applied towards the evaluation of flip-flops. As a result, cycle K+1 of such emulation computes values of evaluated clocks in cycle K+2 and values of flip-flops and latches that correspond to cycle K+1 of the reference time.

Once an emulation cycle has been executed, a number of such cycles may be required to execute consecutively. At the end of a sequence of a number of such cycles, the functional behavior of the design can then be validated against the intended behavior. The process of validation may consume a significant amount of time due to the inherently sequential nature of the validation process.

Design methodologies govern whether a sequential element will be sensitive to the rising edge, falling edge, or both edges of its clock. One common design methodology dictates that a design block may only be sensitive to either the rising edge or falling edge of a clock.

DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Embodiments of the present disclosure describe a method for optimizing emulation throughput by selective application of a clock pattern.

Modern emulation platforms support different methods of generating the values of evaluated clocks, depending upon the usage model. Dynamic evaluation of clocks is based upon parameters known only at emulation time. It is required to be used when there is feedback between the design-under-test (DUT) and the future values of evaluated clocks. When the design does not contain any such feedback, a strategy of statically evaluating clock values may be used. Clock activity may be statically generated and stored as a raw pattern within emulator memory. Alternatively, clock values may also be statically generated by a formula at emulation time based upon stored parameters for the frequency, duty cycle, and phase for each clock.

In any emulation cycle, if there is a sequential element in the design that is sensitive to the updated value of its evaluated clock, the data propagation phase of the cycle may be performed to ensure that the design state is updated for the following cycle of emulation. However, in a sequence of emulation cycles, there may be multiple cycles in which no sequential element in the design is sensitive to the updated value of its clock. For example, in a design that includes only flip-flops that are sensitive to the rising edge of a common primary clock, a cycle in which the primary clock undergoes a falling edge transition may not produce any new data to propagate throughout the design. Such a cycle may be referred to as a globally insensitive emulation clock cycle.

In practice, there are typically many clocks used simultaneously by different blocks of design, each with its own frequency, duty cycle, and phase. As such, there may not be data propagation in all the executed cycles (e.g., up to half of all executed cycles) based on the phase relationship between such clocks.

An effective throughput of emulation may be defined as a ratio between a number of globally sensitive clock cycles that require data propagation, and a total number of executed clock cycles. The present disclosure describes an optimized emulation model that increases effective throughput and thus reduces emulation time.

According to one embodiment, where statically evaluated clock values are used, knowledge of the subsequent clock values before their emulation may be leveraged to optimize the effective throughput of an emulated design. Accordingly, advance knowledge of the sensitivities of sequential elements in the design, as well as subsequent clock values may be required to perform an analysis of whether subsequent statically evaluated clock values may have an impact on the device under test (DUT). As described above, a globally sensitive clock cycle that includes a rising and/or a falling edge may cause a change in the data value of a component of the DUT. A globally insensitive clock cycle is a clock cycle with a rising and/or a falling edge that does not cause a change in the data value of any component of the DUT. Accordingly, when the present system determines a subsequent clock cycle as globally sensitive, the present system applies the subsequent clock cycle to the DUT, where the subsequent clock cycle is allowed to propagate as a regular emulation cycle. One or more emulation cycles continue until one or more consecutive cycles in the statically evaluated clock pattern are deemed globally insensitive. When a globally insensitive clock cycle is encountered, the design is allowed to skip such a globally insensitive clock cycle until the next globally sensitive cycle in the statically evaluated clock pattern is found. Therefore, the effective throughput of emulation may increase because only globally sensitive clock cycles are evaluated. As a result, the emulation time, which is directly correlated with the number of evaluated emulation cycles, decreases in proportion to the gain in effective throughput.

According to one embodiment, the process of determining which emulation cycles are globally insensitive may require characterization of the DUT. The DUT may include one or more primary clocks that drive one or more components of the DUT. Further, depending on the design of the DUT, a rising edge of one clock, for example, a primary clock may trigger a falling edge of another clock, for example, an evaluated clock. For example, a component of the DUT may include a flip-flop or a latch. According to one embodiment, a component of the DUT receives a clock signal as an input. Such a component may be sensitive to either a rising edge or a falling edge of a clock. In other words, an output of the DUT component may change with either the rising edge or the falling edge of the clock signal. Accordingly, a rising edge and a falling edge of each clock may be characterized as either a sensitive or an insensitive edge.

According to one embodiment, an edge of a clock is indicated as a sensitive edge when there are one or more sequential elements, for example, a latch or a flip-flop, in the design that are sensitive to the edge of the clock. This may occur when a primary clock is used to either directly drive a sequential element, or to generate an evaluated clock, as described above. In the latter case, the relationship between a primary clock and its evaluated clock may be considered during analysis. For example, the rising edge of a primary clock can generate the falling edge of an evaluated clock, which in turn may drive sequential elements. Analysis of each clock in the design of the DUT, and which edge of each clock is sensitive or insensitive can be performed through automated tools or a manual methodology. The findings of the analysis may be stored in a memory of an emulation tool, for example, in a database table that may be referred to as a sensitivity table for later retrieval.

According to one embodiment, in addition to the sensitivity table, a clock pattern table may be used to store predetermined values of primary clocks that are to be applied at emulation time. The clock pattern table may also be stored in the memory of the emulation tool. The clock pattern table may include as many rows as primary clocks in the design of the DUT, and as many columns as emulation time units. During the emulation of the DUT, the fastest system clock may be used to access the clock pattern table and sensitivity table, as described in the below sections.

During the first emulation time unit, all rows corresponding to the first column of the clock pattern table may be read. Each row of the clock pattern table refers to a primary clock, and the DUT sensitivity to each edge of the clock in each row may be referred to in the sensitivity table. If one or more clocks are found to have a sensitive edge during the first emulation time unit, then the primary clock values corresponding to the first emulation time unit, i.e., the first column of the clock pattern table, may be applied as the next emulation cycle. However, if a clock edge of each clock of all rows for the first column is found to be insensitive, the statically evaluated cycle of the clock pattern of the first emulation time unit may be considered globally insensitive and skipped by repeating the procedure for the next column of the clock pattern table. Accordingly, the emulation time units of the clock pattern table that have no globally sensitive edge for any of the clocks of any row for the corresponding column of the clock pattern table may be skipped.

The process described above, according to the embodiments described herein, requires schematic transformations to the typical instrumentation applied to an emulation model. The emulation model is considered when there is an overlay between the propagation of primary clocks and the evaluation of flip-flops and latches in the DUT.

Figure 1:
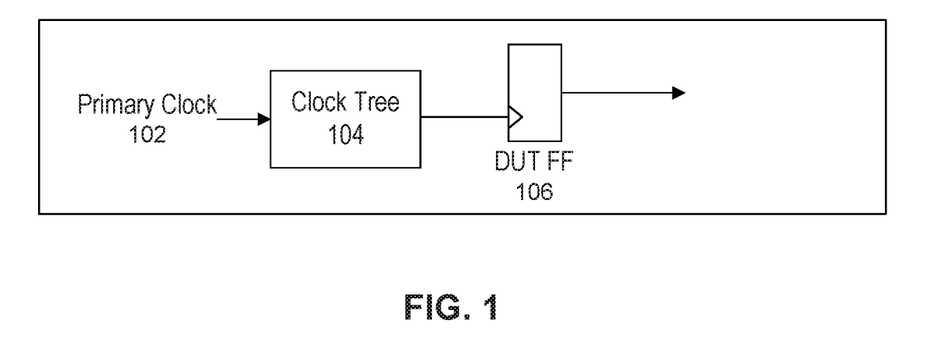
FIG. 1 illustrates a design schematic that does not include any transformations required to support an overlaid emulation model.

FIG. 1 illustrates a design schematic that does not include any transformations required to support an overlaid emulation model. In FIG. 1, a primary clock 102, a clock tree 104, and a flip-flop 106 of a DUT are shown. The clock tree 104 is a clock distribution network within the DUT. The clock tree 104 may include the clocking circuitry and devices from a clock source, for example, the primary clock 102, to a destination, for example, the flip-flop 106. Accordingly, the clock signal from the primary clock 102 may be provided at the clock pin of the flip-flop 106 via the clock tree 104. The clock tree 104 may contain a sizeable proportion of the design of the DUT. The clock tree 104 may implement a clock gating process using a hierarchy of clock enables to gate the clocks of the design of the DUT.

Figure 2:
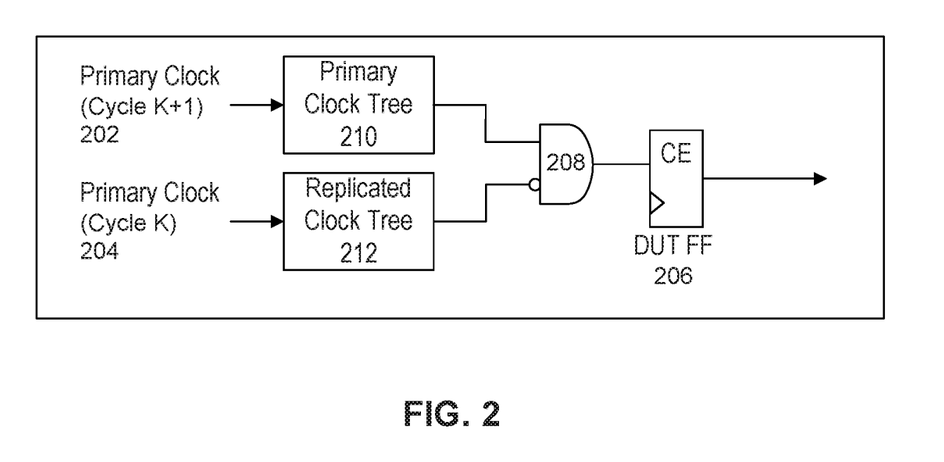
FIG. 2 illustrates a transformed schematic of FIG. 1 with an edge detector for the rising edge of the primary clock, according to an exemplary embodiment of the present disclosure.

FIG. 2 illustrates a transformed schematic of FIG. 1 with an edge detector for the rising edge of the primary clock, according to an exemplary embodiment of the present disclosure. As shown in FIG. 2, an overlaid emulation model is used in which the transformed schematic applies the detected rising edge of the primary clock to the clock-enable pin of the flip-flop. The clock tree is replicated as part of the edge detector transformation, in order to support the consecutive application of globally sensitive statically evaluated cycles of the clock pattern. As shown in FIG. 2, a cycle K+1 202 of the primary clock may represent a statically evaluated cycle that is globally sensitive due to a flip-flop 206 of the design of the DUT that is sensitive to its value. A cycle K 204 represents the statically evaluated cycle directly preceding the cycle K+1 202, whether or not the cycle K 204 is found to be globally sensitive. Values of the primary clock cycles 202 and 204 are applied as inputs to an AND gate 208 via a primary clock tree 210 and a replicated clock tree 212, respectively. The output clock signal of the replicated clock tree 212 is inverted before being applied as an input to the AND gate 208. Accordingly, the primary clock tree 210, the replicated clock tree 212, and the AND gate 208, as shown in FIG. 2, may be used to detect the rising edge of the primary clock signal to which the flip-flop 206 may be sensitive. While FIG. 2 shows a rising edge detector circuitry, a falling edge detector circuitry may be implemented as per the case.

Figure 4A:
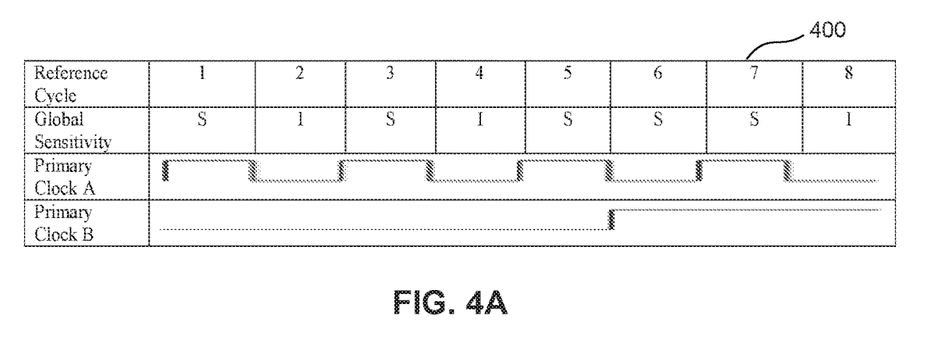
FIG. 4A illustrates a table of clock patterns of two clocks of a design-under-test, according to an exemplary embodiment of the present disclosure.

As shown in FIG. 4A, table 400 illustrates a design of a DUT that, for example, includes two primary clocks and flip-flops that are sensitive to a rising edge of either one of the two primary clocks. As shown below, the statistically evaluated clock shapes of both the primary clocks shown in table 400 may be stored in the clock pattern table. For each cycle of the primary clock A, which is the fastest clock in comparison with the primary clock B, a corresponding entry in the sensitivity table may denote whether the cycle is globally sensitive (S) or globally insensitive (I). As shown in table 400, reference cycles 2, 4, and 8 are globally insensitive cycles because during the references cycles 2, 4, and 8, the primary clock A has a falling edge, and the primary clock B does not undergo a transition. However, the reference cycle 6 in which the primary clock A has a falling edge, the primary clock B has a rising edge. Because the flip-flops in the design, as stated above, are either sensitive to a rising edge of the primary clock A or the primary clock B, the reference cycle 6 is a globally sensitive cycle.

According to one embodiment, table 1 shown below describes how the eight reference cycles of the table 400 above may be produced in five emulation cycles using the rising edge detector, as shown in FIG. 2. Reference cycles 1, 3, and 5 in which the primary clock A has a globally sensitive rising edge may be evaluated in consecutive emulation cycles 1, 2, and 3, respectively. The sequence is evaluated as the primary clock A is undergoing a rising edge on each new emulation cycle. Reference cycle 6 demonstrates how an irregular sensitivity pattern can arise when primary clocks have differing characteristics for their period, duty cycle, and phase. During the reference cycle 6, the primary clock A has a falling edge, but the primary clock B has a rising edge. Here, the primary clock A and the primary clock B are of different frequency and duty cycle.

Further, in the table 1, the primary clock tree A represents cycle K+1 202, and the replicated clock tree A represents cycle K 204. In table 1, during emulation, only five reference cycles of total eight reference cycles may be needed, and emulation time is thereby saved.

TABLE 1

| Emulation Cycle | 1 | 2 | 3 | 4 | 5 |
|---|---|---|---|---|---|
| Reference Cycle | 1 | 3 | 5 | 6 | 7 |
| Primary Clock Tree A | 1 | 1 | 1 | 0 | 1 |
| Replicated Clock A | 0 | 0 | 0 | 1 | 0 |

Figure 3:
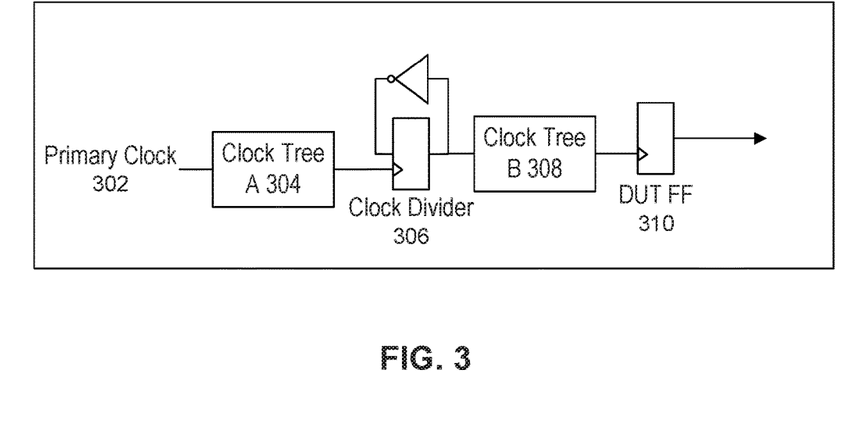
FIG. 3 illustrates a design schematic without any transformations required to support an overlaid emulation model.

In FIGS. 1, 2, and 4A, and table 1, the primary clocks are applied to sequential elements of the DUT via the clock tree. In some embodiments, a primary clock may be used to derive one or more slower clocks using frequency dividers. The frequency dividers may be analog or digital. The frequency dividers may be applied to divide the clock frequency of the primary clock by N-factor, where N is at least 2. FIG. 3 illustrates an original design schematic without any transformations required to support an overlaid emulation model in which the frequency of the primary clock is divided by a frequency divider of 2-factor. FIG. 3 shows a primary clock 302, a clock tree A 304, a frequency divider 306, a clock tree B 308, and a flip-flop 310 of the design of the DUT. The frequency divider 306 has a value of N as 2. Accordingly, the frequency of the clock signal at the enable pin of the flip-flop 310 is half of the frequency of the clock signal of the primary clock A. In FIG. 3, one version of a frequency divider of N=2 is shown by way of a non-limiting example.

Figure 4B:
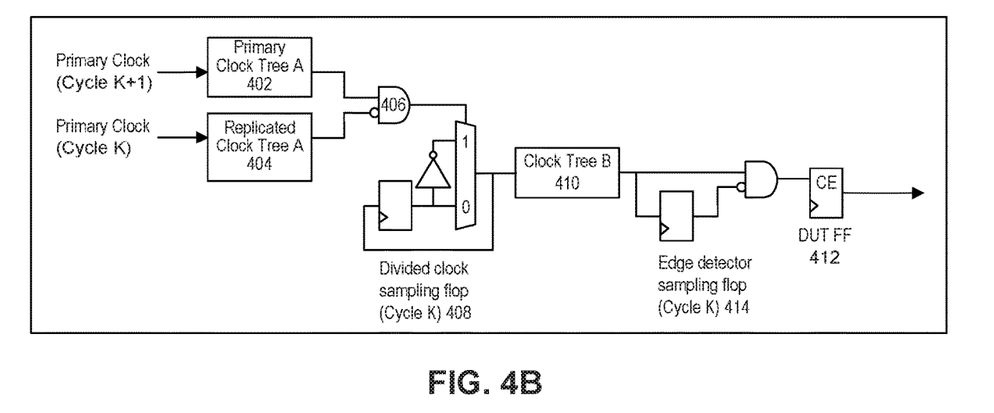
FIG. 4B illustrates the transformed schematic of FIG. 3 that is sensitive to the rising edge of both primary and divided clocks, according to an exemplary embodiment of the present disclosure.

FIG. 4B illustrates the transformed schematic of FIG. 3 that is sensitive to the rising edge of both primary and divided clocks, according to an exemplary embodiment of the present disclosure. The transformation illustrated in FIG. 4B exploits unique optimizations that are available when divided clocks are used. In FIG. 4B, a primary clock rising edge detector is constructed by replicating primary clock tree A 402 as replicated clock tree A 404 and applying an output of an AND gate 406 to a clock divider 408. The output of the clock divider 408 is applied to a clock tree B 410. After propagation through the clock tree B 410, a rising edge of the divided clock is used to drive the clock-enable pin of the destination DUT flip-flop 412 only when a rising edge of the divided clock is detected by the circuitry shown as 414. As shown in FIG. 4B, to detect a rising edge, a clock signal during cycle K is inverted when applied as one of the inputs of an AND gate, and a clock signal during cycle K+1 is applied as another input of the AND gate. Accordingly, an output of the AND gate enables a flip-flop during a rising edge of the clock signal.

By way of a non-limiting example, in some embodiments, the divided clock edge detector may use a sampling flip-flop instead of the replicated clock tree edge detector, as shown in FIG. 4B. Because replication of a clock tree can result in replicating a large fan-in of many look-up tables (LUTs), the use of sampling flip-flops within edge detectors may provide advantages of capacity, and speed, for example.

Accordingly, for portions of the clock tree driven by divided clocks, which is shown as the clock tree B 410, the use of a replicated clock tree may be avoided for the rising edge detector of the divided clock because the clock dividers will only change during globally sensitive cycles. For example, if in a sequence of emulation cycles where the primary clock tree A 402 and the replicated clock tree A 404 are always injected with globally-sensitive and globally-insensitive cycles, respectively, clock sampling flip-flop of the frequency divider 408 will change at most every emulation clock cycle. The use of a single clock tree B 410, and consequentially, a sampling flip-flop edge detector is thus sufficient to ensure the correct functionality of the edge detector connected to the DUT flip-flop.

Accordingly, compared with FIG. 2, where a full replication of the clock tree is required to achieve the required functionality, the logic transformation, as shown in FIG. 4B, may reduce the amount of replicated logic substantially, and thereby optimize the design and its performance during emulation.

Figure 5:
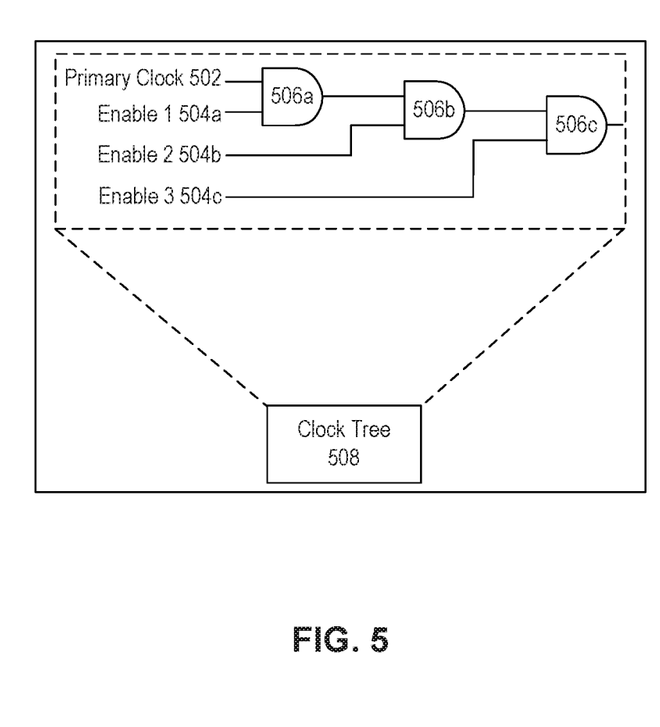
FIG. 5 illustrates an example of a clock tree, which combines a primary clock with several clock-enable signals.

As mentioned in the above paragraphs, the clock tree may implement a clock gating process using a hierarchy of clock enables to gate the clocks of the design of the DUT. FIG. 5 illustrates an example of clock gating in which a clock tree 508 combines a primary clock 502 with several clock-enable signals 504a, 504b, and 504c. The primary clock 502 is initially combined with a cascade of enable signals 504a, 504b, and 504c through a series of AND gates 506a, 506b, and 506c, respectively. In such a case, the entire clock tree 508 is required to be replicated to achieve functional equivalence.

Figure 6:
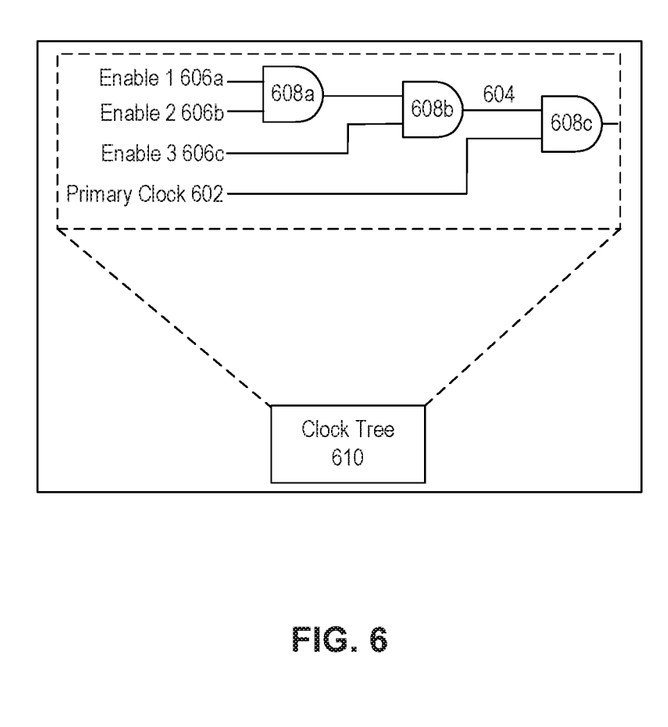
FIG. 6 illustrates a transformed clock tree schematic, according to an exemplary embodiment of the present disclosure.

FIG. 6 illustrates the transformed clock tree schematic, according to an exemplary embodiment of the present disclosure. In FIG. 6, the primary clock 602 is combined with an enable signal 604, which is an output of a cascade of enable signals 606a, 606b, and 606c via respective AND gates 608a and 608b, at an AND gate 608c. While the clock tree 610 shown in FIG. 6 is functionally equivalent to the clock tree 508 shown in FIG. 5, because the AND gate that introduces the value of the primary clock at the end of the cascaded AND gates, only the portion of the clock tree 610 starting from the AND gate 608c is required to be replicated for achieving the same functionality as the clock tree 508 shown in FIG. 5. The AND gates 608a and 608b are not required to be replicated for achieving the functionality of the clock tree 508. Because the enable signals are used as data inputs and are not themselves clocks, the optimization is functionally equivalent. An example of the optimization is shown in FIG. 7, which illustrates the transformed clock tree from FIG. 6 used in an edge detector.

Figure 7:
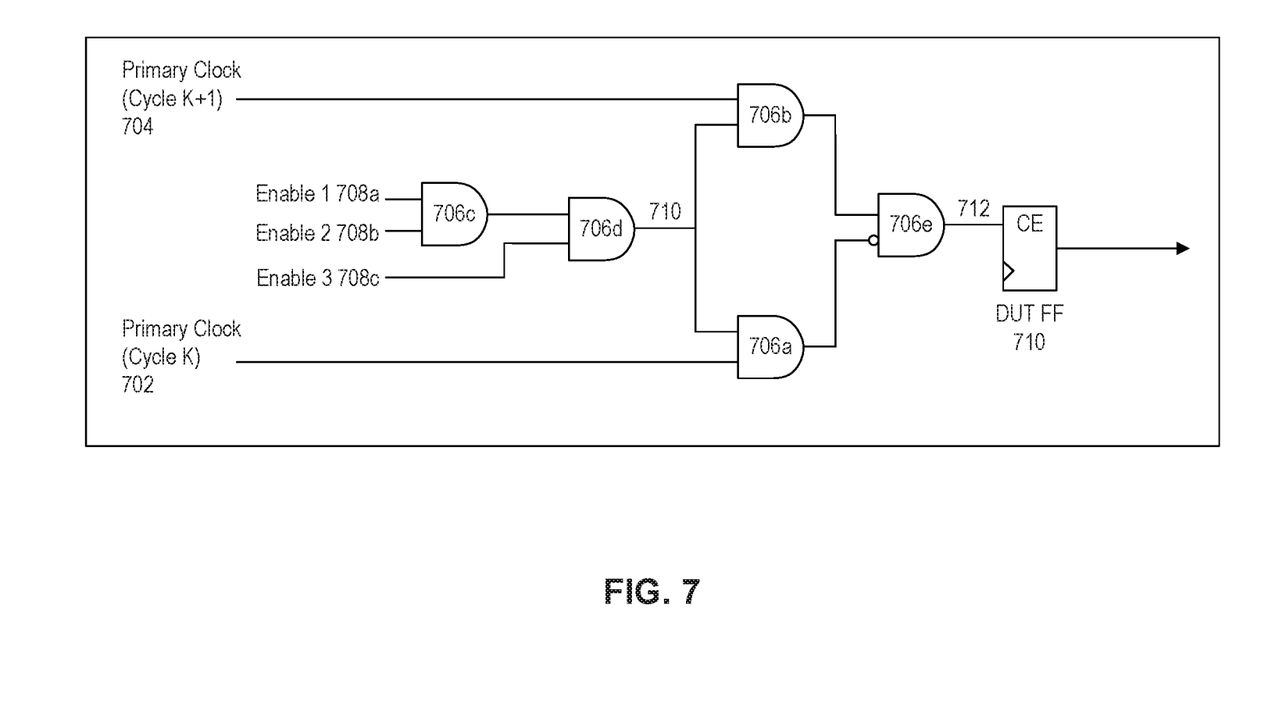
FIG. 7 illustrates the transformed clock tree from FIG. 6 used in an edge detector, according to an exemplary embodiment of the present disclosure.

In some embodiments, as shown in FIG. 7, cycle K 702 and cycle K+1 704 of a primary clock are fed as an input to AND gates 706a and 706b, respectively. The other input of the AND gate 706a and the AND gate 706b is an output signal 710 based on a cascade of enable signals 708a, 708b, and 708c through AND gates 706c and 706d. An output signal from the AND gate 706b and an inverted output signal from the AND gate 706a is applied to an AND gate 706e to generate an enable signal 712 for a flip-flop 710 of the design of the DUT. Even though only three enable signals 708a, 708b, and 708c are shown in the cascade of enable signals, there may be more or less than three enable signals.

Figure 8:
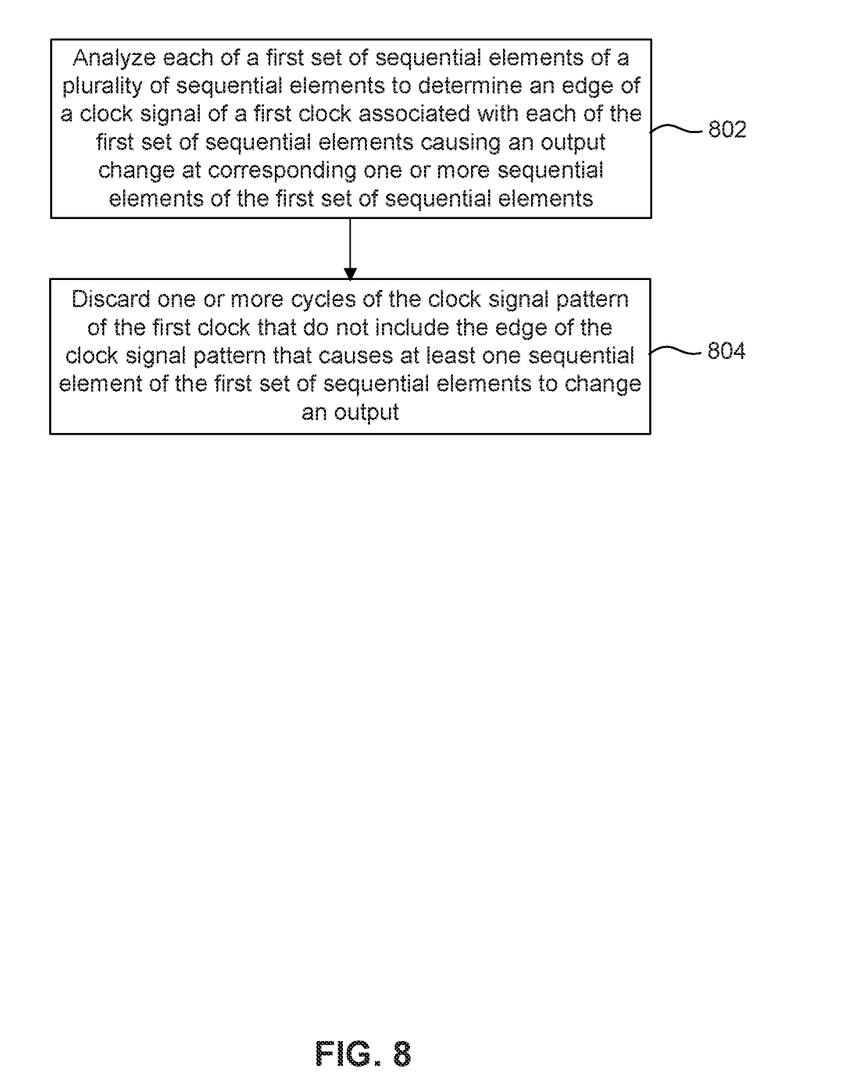
FIG. 8 illustrates a flowchart of a method for optimizing emulation throughput, according to an exemplary embodiment of the present disclosure.

FIG. 8 illustrates a flowchart of a method for optimizing emulation throughput, according to an exemplary embodiment of the present disclosure. At 802, each sequential element of a first set of sequential elements of a plurality of sequential elements is analyzed to determine an edge of a clock signal pattern of a first clock to which each sequential element is sensitive. As described above, the design of the DUT may include a plurality of sequential elements. The first set of sequential elements of the plurality of sequential elements is receiving the clock signal pattern of the first clock. A second set of sequential elements of the plurality of sequential elements may receive a clock signal from a second clock, for example, a divided clock generated from the first clock, or another clock having frequency lower than the frequency of the first clock. By way of a non-limiting example, a sequential element A of the first set of sequential elements may be sensitive to a rising edge of the clock signal pattern of the first clock, but a sequential element B of the first set of sequential elements and a sequential element C of the second set of sequential elements may be sensitive to a falling edge of the clock signal pattern of the first clock and the second clock, respectively. By sensitive to a rising or falling edge of the clock signal, it means that at the sensitive edge of the clock signal, the sequential element may change its output at the output pin.

At 804, one or more cycles of the clock signal pattern of the first clock are discarded from emulation. The one or more discarded cycles do not include an edge of the clock signal pattern in which any sequential element of any set of sequential elements is sensitive. The remaining cycles of the clock signal pattern of the first clock are emulated. The emulated cycles of the clock signal pattern include an edge of the clock signal pattern to which at least one sequential element of the first set of sequential elements is sensitive. In other words, at least one sequential element of the first set of sequential elements may change its output when a clock signal during the emulated cycle is provided as input or enable signal to the sequential element. Accordingly, the emulation process is expedited, and the emulation process throughput is increased.

Figure 9:
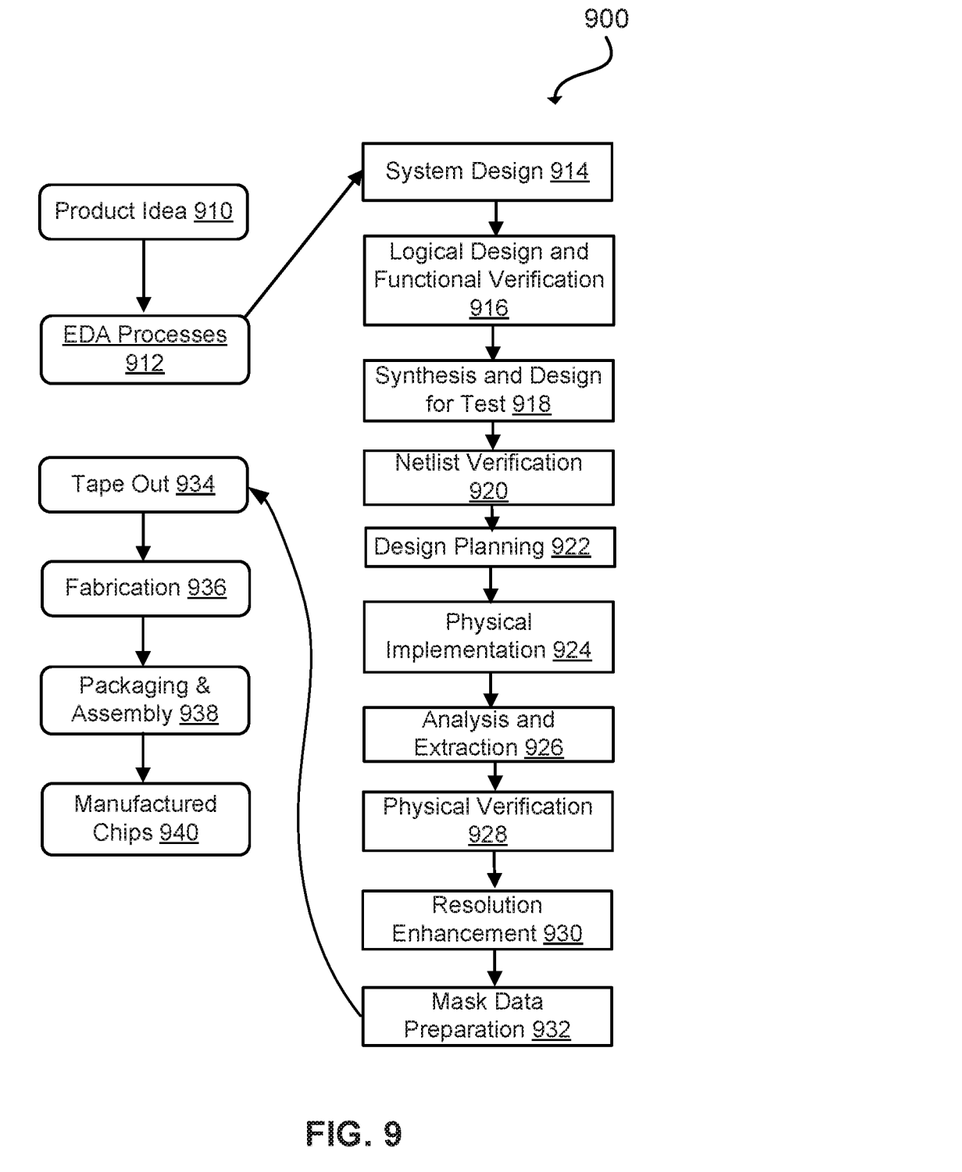
FIG. 9 illustrates a flowchart of various processes used during the design and fabrication of an integrated circuit, according to an exemplary embodiment of the present disclosure.

FIG. 9 illustrates an example set of processes 900 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 910 with information supplied by a designer, information that is transformed to create an article of manufacture that uses a set of EDA processes 912. When the design is finalized, the design is taped-out 934, which is when artwork (e.g., geometric patterns) for the integrated circuit is sent to a fabrication facility to manufacture the mask set, which is then used to manufacture the integrated circuit. After tape-out, a semiconductor die is fabricated 936, and packaging and assembly processes 938 are performed to produce the finished integrated circuit 940.

Specifications for a circuit or electronic structure may range from low-level transistor material layouts to high-level description languages. A high-level of abstraction may be used to design circuits and systems, using a hardware description language (HDL) such as VHDL, Verilog, SystemVerilog, SystemC, MyHDL or OpenVera. The HDL description can be transformed to a logic-level register transfer level (RTL) description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying descriptions that are more detailed is SPICE, which is used for detailed descriptions of circuits with many analog components. Descriptions at each level of abstraction are enabled for use by the corresponding tools of that layer (e.g., a formal verification tool). A design process may use a sequence depicted in FIG. 9. The processes described by being enabled by EDA products (or tools).

During system design 914, the functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During the logic design and functional verification 916, modules or components in the circuit are specified in one or more description languages, and the specification is checked for functional accuracy. For example, the components of the circuit may be verified to generate outputs that match the requirements of the specification of the circuit or system being designed. Functional verification may use simulators and other programs such as test bench generators, static HDL checkers, and formal verifiers. In some embodiments, special systems of components referred to as 'emulators' or 'prototyping systems' are used to speed up the functional verification.

During synthesis and design for test 918, HDL code is transformed into a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 920, the netlist is checked for compliance with timing constraints and for correspondence with the HDL code. During design planning 922, an overall floor plan for the integrated circuit is constructed and analyzed for timing and top-level routing.

During layout or physical implementation 924, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flip-flop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 926, the circuit function is verified at the layout level, which permits refinement of the layout design. During physical verification 928, the layout design is checked to ensure that manufacturing constraints are correct, such as DRC constraints, electrical constraints, lithographic constraints, and that circuitry function matches the HDL design specification. During resolution enhancement 930, the geometry of the layout is transformed to improve how the circuit design is manufactured.

During tape-out, data is created to be used (after lithographic enhancements are applied if appropriate) for the production of lithography masks. During mask data preparation 932, the 'tape-out' data is used to produce lithography masks that are used to produce finished integrated circuits.

A storage subsystem of a computer system (such as computer system 1100 of FIG. 11, or host system 1007 of FIG. 10) may be used to store the programs and data structures that are used by some or all of the EDA products described herein, and products used for the development of cells for the library and for the physical and logical design that use the library.

Figure 10:
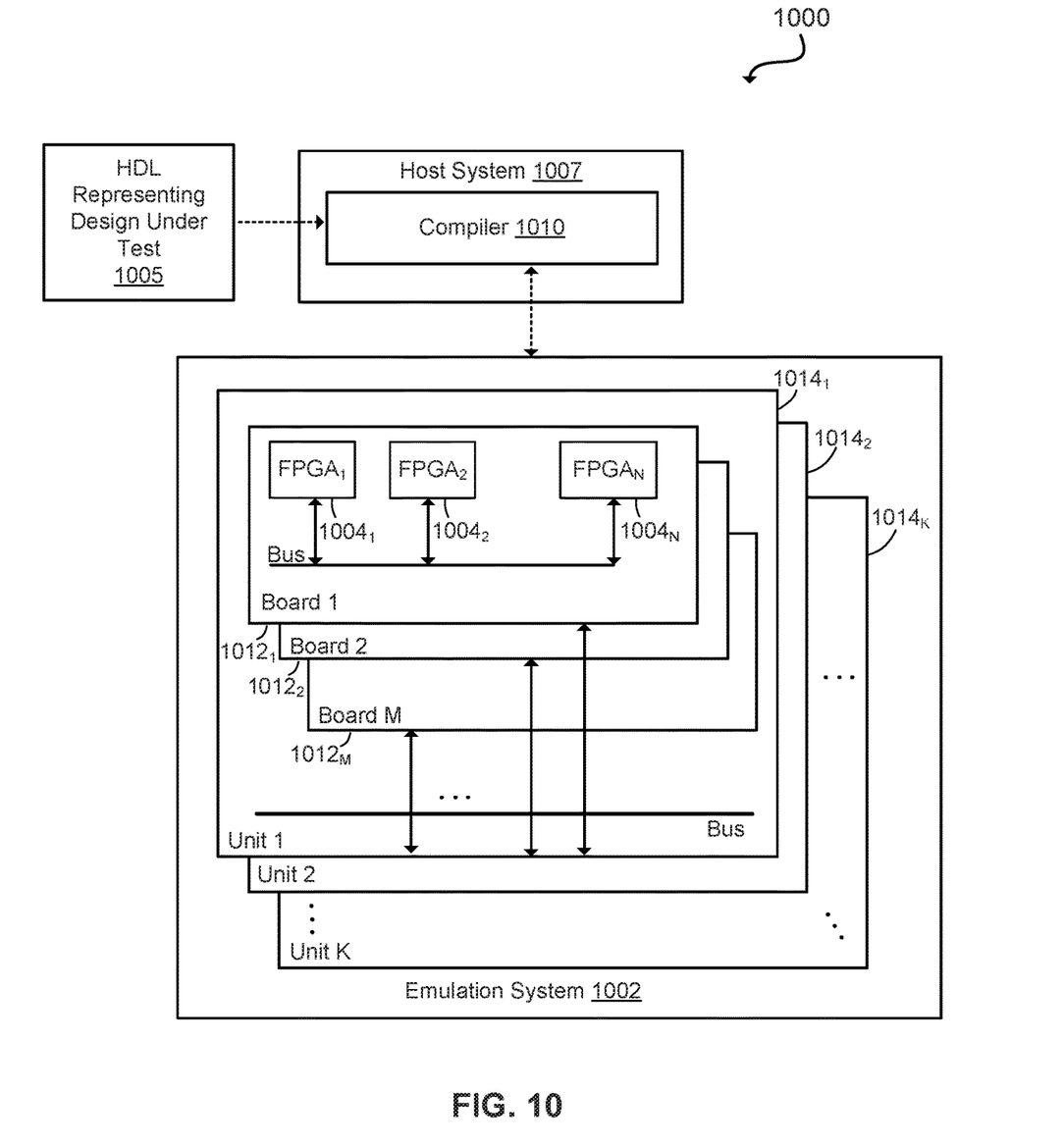
FIG. 10 illustrates a diagram of a emulation system, according to an exemplary embodiment of the present disclosure.

FIG. 10 depicts an abstract diagram of an example emulation environment 1000. An emulation environment 1000 may be configured to verify the functionality of the circuit design. The emulation environment 1000 may include a host system 1007 (e.g., a computer that is part of an EDA system) and an emulation system 1002 (e.g., a set of programmable devices such as Field Programmable Gate Arrays (FPGAs) or processors). The host system generates data and information by using a compiler 1010 to structure the emulation system to emulate a circuit design. Circuit design to be emulated is also referred to as a Design Under Test (DUT) where data and information from the emulation are used to verify the functionality of the DUT.

The host system 1007 may include one or more processors. In the embodiment where the host system includes multiple processors, the functions described herein as being performed by the host system can be distributed among the multiple processors. The host system 1007 may include a compiler 1010 to transform specifications written in a description language that represents a DUT and to produce data (e.g., binary data) and information that is used to structure the emulation system 1002 to emulate the DUT. The compiler 1010 can transform, change, restructure, add new functions to, and/or control the timing of the DUT.

The host system 1007 and emulation system 1002 exchange data and information using signals carried by an emulation connection. The connection can be but is not limited to, one or more electrical cables such as cables with pin structures compatible with the Recommended Standard 232 (RS232) or universal serial bus (USB) protocols. The connection can be a wired communication medium or network such as a local area network or a wide area network such as the Internet. The connection can be a wireless communication medium or a network with one or more points of access using a wireless protocol such as BLUETOOTH or IEEE 802.11. The host system 1007 and emulation system 1002 can exchange data and information through a third device such as a network server.

The emulation system 1002 includes multiple FPGAs (or other modules) such as FPGAs $1004_1$ and $1004_2$, as well as additional FPGAs to $1004_N$. Each FPGA can include one or more FPGA interfaces through which the FPGA is connected to other FPGAs (and potentially other emulation components) for the FPGAs to exchange signals. An FPGA interface can be referred to as an input/output pin or an FPGA pad. While an emulator may include FPGAs, embodiments of emulators can include other types of logic blocks instead of, or along with, the FPGAs for emulating DUTs. For example, the emulation system 1002 can include custom FPGAs, specialized ASICs for emulation or prototyping, memories, and input/output devices.

A programmable device can include an array of programmable logic blocks and a hierarchy of interconnections that can enable the programmable logic blocks to be interconnected according to the descriptions in the HDL code. Each of the programmable logic blocks can enable complex combinational functions or enable logic gates such as AND, and XOR logic blocks. In some embodiments, the logic blocks also can include memory elements/devices, which can be simple latches, flip-flops, or other blocks of memory. Depending on the length of the interconnections between different logic blocks, signals can arrive at input terminals of the logic blocks at different times and thus may be temporarily stored in the memory elements/devices.

FPGAs $1004_1$-$1004_N$ may be placed onto one or more boards $1012_1$ and $1012_2$ as well as additional boards through $1012_M$. Multiple boards can be placed into an emulation unit $1014_1$. The boards within an emulation unit can be connected using the backplane of the emulation unit or any other types of connections. In addition, multiple emulation units (e.g., $1014_1$ and $1014_2$ through $1014_K$) can be connected to each other by cables or any other means to form a multi-emulation unit system.

For a DUT that is to be emulated, the host system 1007 transmits one or more bit files to the emulation system 1002. The bit files may specify a description of the DUT and may further specify partitions of the DUT created by the host system 1007 with trace and injection logic, mappings of the partitions to the FPGAs of the emulator, and design constraints. Using the bit files, the emulator structures the FPGAs to perform the functions of the DUT. In some embodiments, one or more FPGAs of the emulators may have the trace and injection logic built into the silicon of the FPGA. In such an embodiment, the FPGAs may not be structured by the host system to emulate trace and injection logic.

The host system 1007 receives a description of a DUT that is to be emulated. In some embodiments, the DUT description is in a description language (e.g., a register transfer language (RTL)). In some embodiments, the DUT description is in netlist level files or a mix of netlist level files and HDL files. If part of the DUT description or the entire DUT description is in an HDL, then the host system can synthesize the DUT description to create a gate-level netlist using the DUT description. A host system can use the netlist of the DUT to partition the DUT into multiple partitions, where one or more of the partitions include trace and injection logic. The trace and injection logic traces interface signals that are exchanged via the interfaces of an FPGA. Additionally, the trace and injection logic can inject traced interface signals into the logic of the FPGA. The host system maps each partition to an FPGA of the emulator. In some embodiments, the trace and injection logic is included in select partitions for a group of FPGAs. The trace and injection logic can be built into one or more of the FPGAs of an emulator. The host system can synthesize multiplexers to be mapped into the FPGAs. The multiplexers can be used by the trace and injection logic to inject interface signals into the DUT logic.

The host system creates bit files describing each partition of the DUT and the mapping of the partitions to the FPGAs. For partitions in which trace and injection logic are included, the bit files also describe the logic that is included. The bit files can include place and route information and design constraints. The host system stores the bit files and information describing which FPGAs are to emulate each component of the DUT (e.g., to which FPGAs each component is mapped).

Upon request, the host system transmits the bit files to the emulator. The host system signals the emulator to start the emulation of the DUT. During emulation of the DUT or at the end of the emulation, the host system receives emulation results from the emulator through the emulation connection. Emulation results are data and information generated by the emulator during the emulation of the DUT, which includes interface signals and states of interface signals that have been traced by the trace and injection logic of each FPGA. The host system can store the emulation results and/or transmits the emulation results to another processing system.

After emulation of the DUT, a circuit designer can request to debug a component of the DUT. If such a request is made, the circuit designer can specify a time period of the emulation to debug. The host system identifies which FPGAs are emulating the component using the stored information. The host system retrieves stored interface signals associated with the time period and traced by the trace and injection logic of each identified FPGA. The host system signals the emulator to re-emulate the identified FPGAs. The host system transmits the retrieved interface signals to the emulator to re-emulate the component for the specified time period. The trace and injection logic of each identified FPGA injects its respective interface signals received from the host system into the logic of the DUT mapped to the FPGA. In the case of multiple re-emulations of an FPGA, merging the results produces a full debug view.

The host system receives, from the emulation system, signals traced by the logic of the identified FPGAs during the re-emulation of the component. The host system stores the signals received from the emulator. The signals traced during the re-emulation can have a higher sampling rate than the sampling rate during the initial emulation. For example, in the initial emulation, a traced signal can include a saved state of the component every X milliseconds. However, in the re-emulation, the traced signal can include a saved state every Y milliseconds where Y is less than X. If the circuit designer requests to view a waveform of a signal traced during the re-emulation, the host system can retrieve the stored signal and display a plot of the signal. For example, the host system can generate a waveform of the signal. Afterward, the circuit designer can request to re-emulate the same component for a different time period or to re-emulate another component.

A host system 1007 and/or the compiler 1010 may include subsystems such as, but not limited to, a design synthesizer sub-system, a mapping sub-system, a run time sub-system, a results sub-system, a debug sub-system, a waveform sub-system, and a storage sub-system. The sub-systems can be structured and enabled as an individual or multiple modules, or two or more may be structured as a module. Together these sub-systems structure the emulator and monitor the emulation results.

The design synthesizer sub-system transforms the HDL that is representing a DUT 1005 into gate-level logic. For a DUT that is to be emulated, the design synthesizer sub-system receives a description of the DUT. If the description of the DUT is fully or partially in HDL (e.g., RTL or another level of abstraction), the design synthesizer sub-system synthesizes the HDL of the DUT to create a gate-level netlist with a description of the DUT in terms of gate-level logic.

The mapping sub-system partitions DUTs and maps the partitions into emulator FPGAs. The mapping sub-system partitions a DUT at the gate level into a number of partitions using the netlist of the DUT. For each partition, the mapping sub-system retrieves a gate-level description of the trace and injection logic and adds the logic to the partition. As described above, the trace and injection logic included in a partition is used to trace signals exchanged via the interfaces of an FPGA to which the partition is mapped (trace interface signals). The trace and injection logic can be added to the DUT prior to the partitioning. For example, the trace and injection logic can be added by the design synthesizer sub-system prior to or after the synthesizing the HDL of the DUT.

In addition to including the trace and injection logic, the mapping sub-system can include additional tracing logic in a partition to trace the states of certain DUT components that are not traced by the trace and injection. The mapping sub-system can include the additional tracing logic in the DUT prior to the partitioning or in partitions after the partitioning. The design synthesizer sub-system can include the additional tracing logic in an HDL description of the DUT prior to synthesizing the HDL description.

The mapping sub-system maps each partition of the DUT to an FPGA of the emulator. For partitioning and mapping, the mapping sub-system uses design rules, design constraints (e.g., timing or logic constraints), and information about the emulator. For components of the DUT, the mapping sub-system stores information in the storage sub-system describing which FPGAs are to emulate each component.

Using the partitioning and the mapping, the mapping sub-system generates one or more bit files that describe the created partitions and the mapping of logic to each FPGA of the emulator. The bit files can include additional information such as constraints of the DUT and routing information of connections between FPGAs and connections within each FPGA. The mapping sub-system can generate a bit file for each partition of the DUT and can store the bit file in the storage sub-system. Upon request from a circuit designer, the mapping sub-system transmits the bit files to the emulator, and the emulator can use the bit files to structure the FPGAs to emulate the DUT.

If the emulator includes specialized ASICs that include the trace and injection logic, the mapping sub-system can generate a specific structure that connects the specialized ASICs to the DUT. In some embodiments, the mapping sub-system can save the information of the traced/injected signal and where the information is stored on the specialized ASIC.

The run time sub-system controls emulations performed by the emulator. The run time sub-system can cause the emulator to start or stop executing an emulation. Additionally, the run time sub-system can provide input signals and data to the emulator. The input signals can be provided directly to the emulator through the connection or indirectly through other input signal devices. For example, the host system can control an input signal device to provide the input signals to the emulator. The input signal device can be, for example, a test board (directly or through cables), a signal generator, another emulator, or another host system.

The results sub-system processes emulation results generated by the emulator. During emulation and/or after completing the emulation, the results sub-system receives emulation results from the emulator generated during the emulation. The emulation results include signals traced during the emulation. Specifically, the emulation results include interface signals traced by the trace and injection logic emulated by each FPGA and can include signals traced by additional logic included in the DUT. Each traced signal can span multiple cycles of the emulation. A traced signal includes multiple states, and each state is associated with a time of the emulation. The results sub-system stores the traced signals in the storage sub-system. For each stored signal, the results sub-system can store information indicating which FPGA generated the traced signal.

The debug sub-system allows circuit designers to debug DUT components. After the emulator has emulated a DUT and the results sub-system has received the interface signals traced by the trace and injection logic during the emulation, a circuit designer can request to debug a component of the DUT by re-emulating the component for a specific time period. In a request to debug a component, the circuit designer identifies the component and indicates a time period of the emulation to debug. The circuit designer's request can include a sampling rate that indicates how often states of debugged components should be saved by logic that traces signals.

The debug sub-system identifies one or more FPGAs of the emulator that are emulating the component using the information stored by the mapping sub-system in the storage sub-system. For each identified FPGA, the debug sub-system retrieves, from the storage sub-system, interface signals traced by the trace and injection logic of the FPGA during the time period indicated by the circuit designer. For example, the debug sub-system retrieves states traced by the trace and injection logic that is associated with the time period.

The debug sub-system transmits the retrieved interface signals to the emulator. The debug sub-system instructs the debug sub-system to use the identified FPGAs and for the trace and injection logic of each identified FPGA to inject its respective traced signals into the logic of the FPGA to re-emulate the component for the requested time period. The debug sub-system can further transmit the sampling rate provided by the circuit designer to the emulator so that the tracing logic traces states at the proper intervals.

To debug the component, the emulator can use the FPGAs to which the component has been mapped. Additionally, the re-emulation of the component can be performed at any point specified by the circuit designer.

For an identified FPGA, the debug sub-system can transmit instructions to the emulator to load multiple emulator FPGAs with the same configuration of the identified FPGA. The debug sub-system additionally signals the emulator to use the multiple FPGAs in parallel. Each FPGA from the multiple FPGAs is used with a different time window of the interface signals to generate a larger time window in a shorter amount of time. For example, the identified FPGA can require an hour or more to use a certain amount of cycles. However, if multiple FPGAs have the same data and structure of the identified FPGA and each of these FPGAs runs a subset of the cycles, the emulator can require a few minutes for the FPGAs to use all the cycles collectively.

A circuit designer can identify a hierarchy or a list of DUT signals to re-emulate. To enable this, the debug sub-system determines the FPGA needed to emulate the hierarchy or list of signals, retrieves the necessary interface signals, and transmits the retrieved interface signals to the emulator for re-emulation. Thus, a circuit designer can identify any element (e.g., component, device, or signal) of the DUT to debug/re-emulate.

The waveform sub-system generates waveforms using the traced signals. If a circuit designer requests to view a waveform of a signal traced during an emulation run, the host system retrieves the signal from the storage sub-system. The waveform sub-system displays a plot of the signal. For one or more signals, when the signals are received from the emulator, the waveform sub-system can automatically generate the plots of the signals.

Figure 11:
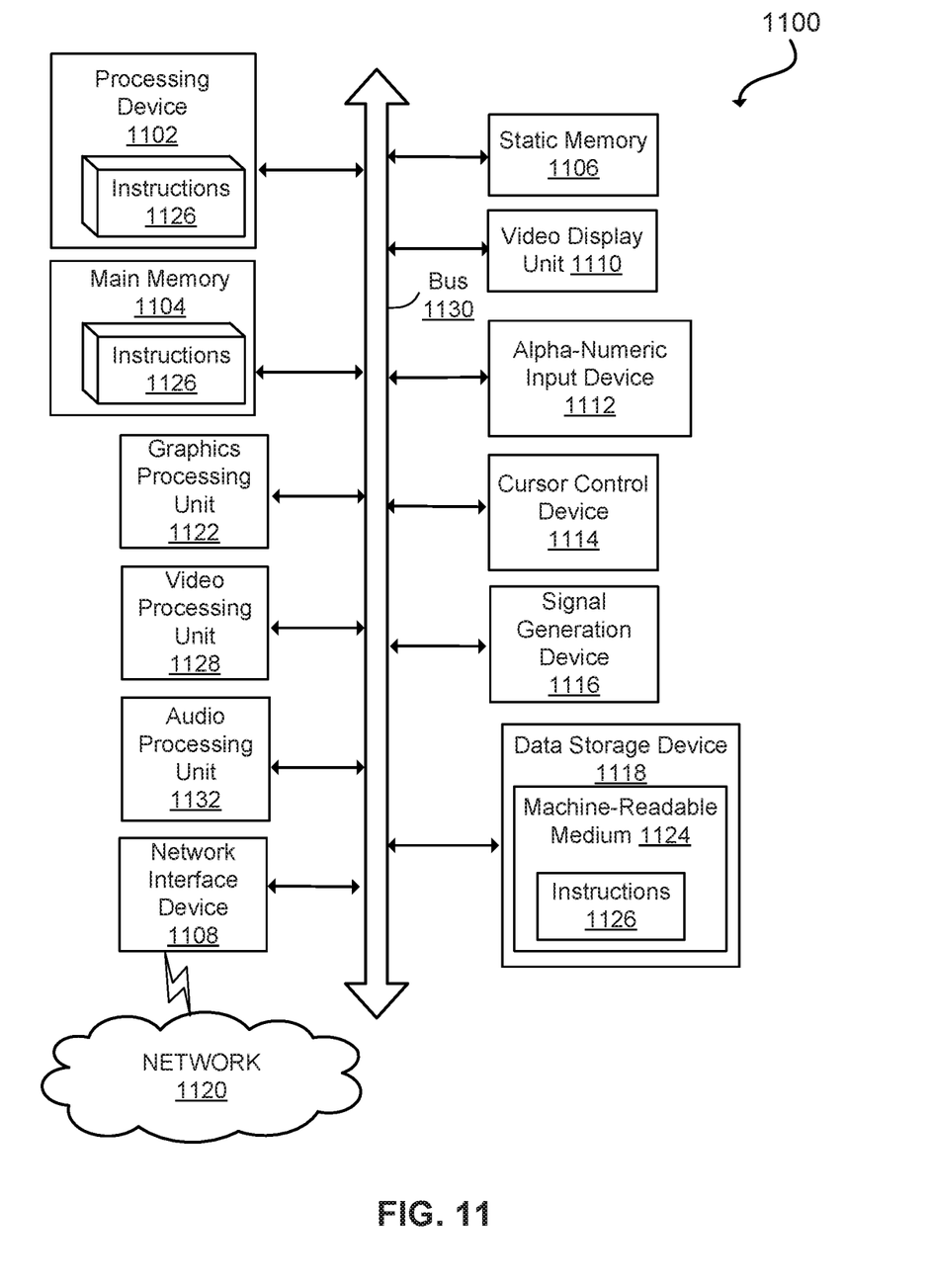
FIG. 11 illustrates a diagram of a computer system, according to an exemplary embodiment of the present.

FIG. 11 illustrates an example machine of a computer system 1100 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in a client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1100 includes a processing device 1102, a main memory 1104 (e.g., read-only memory (ROM), flash memory, dynamic random access memory (DRAM) such as synchronous DRAM (SDRAM), a static memory 1106 (e.g., flash memory, static random access memory (SRAM), etc.), and a data storage device 1118, which communicate with each other via a bus 1130.

The processing device 1102 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 1102 may also be one or more special-purpose processing devices such as an application-specific integrated circuit (ASIC), a field-programmable gate array (FPGA), a digital signal processor (DSP), network processor, or the like. The processing device 1102 may be configured to execute instructions 1126 for performing the operations and steps described herein.

The computer system 1100 may further include a network interface device 1108 to communicate over the network 1120. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), a graphics processing unit 1122, a signal generation device 1116 (e.g., a speaker), graphics processing unit 1122, video processing unit 1128, and audio processing unit 1132.

The data storage device 1118 may include a machine-readable storage medium 1124 (also known as a non-transitory computer-readable medium) on which is stored one or more sets of instructions 1126 or software embodying any one or more of the methodologies or functions described herein. The instructions 1126 may also reside, completely or at least partially, within the main memory 1104 and/or within the processing device 1102 during execution thereof by the computer system 1100, the main memory 1104, and the processing device 1102 also constituting machine-readable storage media.

In some implementations, the instructions 1126 include instructions to implement functionality corresponding to the present disclosure. While the machine-readable storage medium 1124 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1102 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work to others skilled in the art most effectively. An algorithm may be a sequence of operations leading to the desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer-readable storage medium, such as but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure, as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as read-only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the scope of implementations of the disclosure as set forth in the following claims. Where the disclosure refers to some elements in the singular tense, more than one element can be depicted in the figures, and like elements are labeled with like numerals. The disclosure and drawings are, accordingly, to be regarded in an illustrative sense rather than a restrictive sense.

What is claimed:

1. A system, comprising:
a host system comprising:
a memory; and
a processor configured to perform operations stored in the memory, wherein the processor executes the operations to:
analyze each of a first set of sequential elements of a plurality of sequential elements to determine an edge of a clock signal pattern of a clock associated with each of the first set of sequential elements causing an output change at corresponding one or more sequential elements of the first set of sequential elements;
discard one or more cycles of the clock signal pattern of the clock from emulation that do not include the edge of the clock signal pattern that causes at least one sequential element of the first set of sequential elements to change an output; and
replicate a clock tree to generate a replicated clock tree, wherein the clock tree and the replicated clock tree are fed adjacent cycles of the clock signal pattern of the clock.

2. The system of claim 1, wherein the processor executes the operations to further emulate remaining cycles of the clock signal pattern of the clock.

3. The system of claim 1, wherein a sequential element of the first set of sequential elements is a flip-flop or a latch.

4. The system of claim 1, wherein the processor executes the operations to further detect a rising edge of the clock signal pattern of the clock using a first rising edge detector that comprises the clock tree and the replicated clock tree.

5. The system of claim 4, wherein the processor executes the operations to further apply an output of the first rising edge detector as an enable signal of the at least one sequential element of the first set of sequential elements.

6. The system of claim 4, wherein the first rising edge detector further comprises a plurality of enable signals as inputs to a plurality of cascaded AND gates, and
wherein the processor executes the operations to further apply an output of the cascaded AND gates as a second input to a first and a second AND gates that receive the clock tree and the replicated clock tree, respectively, as a first input.

7. The system of claim 1, wherein the processor executes the operations to further:
generate a divided clock of the clock for a second set of sequential elements of the plurality of sequential elements;
analyze each of the second set of sequential elements of the plurality of sequential elements to determine an edge of a clock signal pattern of the divided clock associated with each of the second set of sequential elements causing an output change at corresponding one or more sequential elements of the second set of sequential elements; and
emulate the one or more cycles of the clock signal pattern of the clock that are discarded upon determining that the one or more discarded cycles include the edge of the clock signal pattern of the divided clock that causes at least one sequential element of the second set of sequential elements to change the output.

8. The system of claim 7, wherein the processor executes the operations to further propagate the clock signal pattern of the divided clock to the second set of sequential elements using an additional clock tree; and
detect a rising edge of the clock signal pattern of the divided clock using a second rising edge detector.

9. The system of claim 8, wherein the processor executes the operations to further detect the rising edge of the clock signal pattern of the divided clock without replicating the additional clock tree.

10. A method, comprising:
analyzing each of a first set of sequential elements of a plurality of sequential elements to determine an edge of a clock signal pattern of a clock associated with each of the first set of sequential elements causing an output change at corresponding one or more sequential elements of the first set of sequential elements;
discarding one or more cycles of the clock signal pattern of the clock from emulation that do not include the edge of the clock signal pattern that causes at least one sequential element of the first set of sequential elements to change an output;
generating a divided clock of the clock for a second set of sequential elements of the plurality of sequential elements;
analyzing each of the second set of sequential elements of the plurality of sequential elements to determine an edge of a clock signal pattern of the divided clock associated with each of the second set of sequential elements causing an output change at corresponding one or more sequential elements of the second set of sequential elements; and
emulating the one or more discarded cycles of the clock signal pattern of the clock upon determining that the one or more discarded cycles include the edge of the clock signal pattern of the divided clock that causes at least one sequential element of the second set of sequential elements to change the output.

11. The method of claim 10, further comprising:
emulating remaining cycles of the clock signal pattern of the clock, and
wherein a sequential element of the first set of sequential elements is a flip-flop or a latch.

12. The method of claim 10, further comprising replicating a clock tree to generate a replicated clock tree, wherein the clock tree is configured to propagate the clock signal pattern of the clock to the first set of sequential elements.

13. The method of claim 12, further comprising processing a current cycle K of the clock signal pattern of the clock at the clock tree and a previous cycle K−1 of the current cycle K at the replicated clock tree.

14. The method of claim 12, further comprising detecting a rising edge of the clock signal pattern of the clock using a first rising edge detector that comprises the clock tree and the replicated clock tree.

15. The method of claim 14, further comprising applying an output of the first rising edge detector as an enable signal of the at least one sequential element of the first set of sequential elements.

16. A non-transitory, tangible computer-readable media having instructions stored thereon that, when executed by at least one computing device, causes the at least one computing device to perform operations comprising:
analyzing each of a first set of sequential elements of a plurality of sequential elements to determine an edge of a clock signal pattern of a clock associated with each of the first set of sequential elements causing an output change at corresponding one or more sequential elements of the first set of sequential elements;
discarding one or more cycles of the clock signal pattern of the clock from emulation that do not include the edge of the clock signal pattern that causes at least one sequential element of the first set of sequential elements to change an output; and replicating a clock tree to generate a replicated clock tree, wherein the clock tree and the replicated clock tree are fed adjacent cycles of the clock signal pattern of the clock.

17. The non-transitory, tangible computer-readable media of claim 16, wherein the operations further comprise emulating remaining cycles of the clock signal pattern of the clock, and wherein a sequential element of the first set of sequential elements is a flip-flop or a latch.

18. The non-transitory, tangible computer-readable media of claim 16, wherein the operations further comprise:

generating a divided clock of the clock for a second set of sequential elements of the plurality of sequential elements, wherein the frequency of the clock is divided by a factor of N, and wherein N is at least 2;

analyzing each of the second set of sequential elements of the plurality of sequential elements to determine an edge of a clock signal pattern of the divided clock associated with each of the second set of sequential elements causing an output change at corresponding one or more sequential elements of the second set of sequential elements; and emulating the one or more discarded cycles of the clock signal pattern of the clock upon determining that the one or more discarded cycles include the edge of the clock signal pattern of the divided clock that causes at least one sequential element of the second set of sequential elements to change the output.

* * * * *